May 23, 1933.  C. B. TINNEN  1,911,045
PORTABLE GUIDE FOR ELECTRIC SAWS
Filed Jan. 2, 1932   4 Sheets-Sheet 1

INVENTOR,
C. B. Tinnen;
BY F. E. Maynard
ATTORNEY.

May 23, 1933. C. B. TINNEN 1,911,045
PORTABLE GUIDE FOR ELECTRIC SAWS
Filed Jan. 2, 1932 4 Sheets-Sheet 2
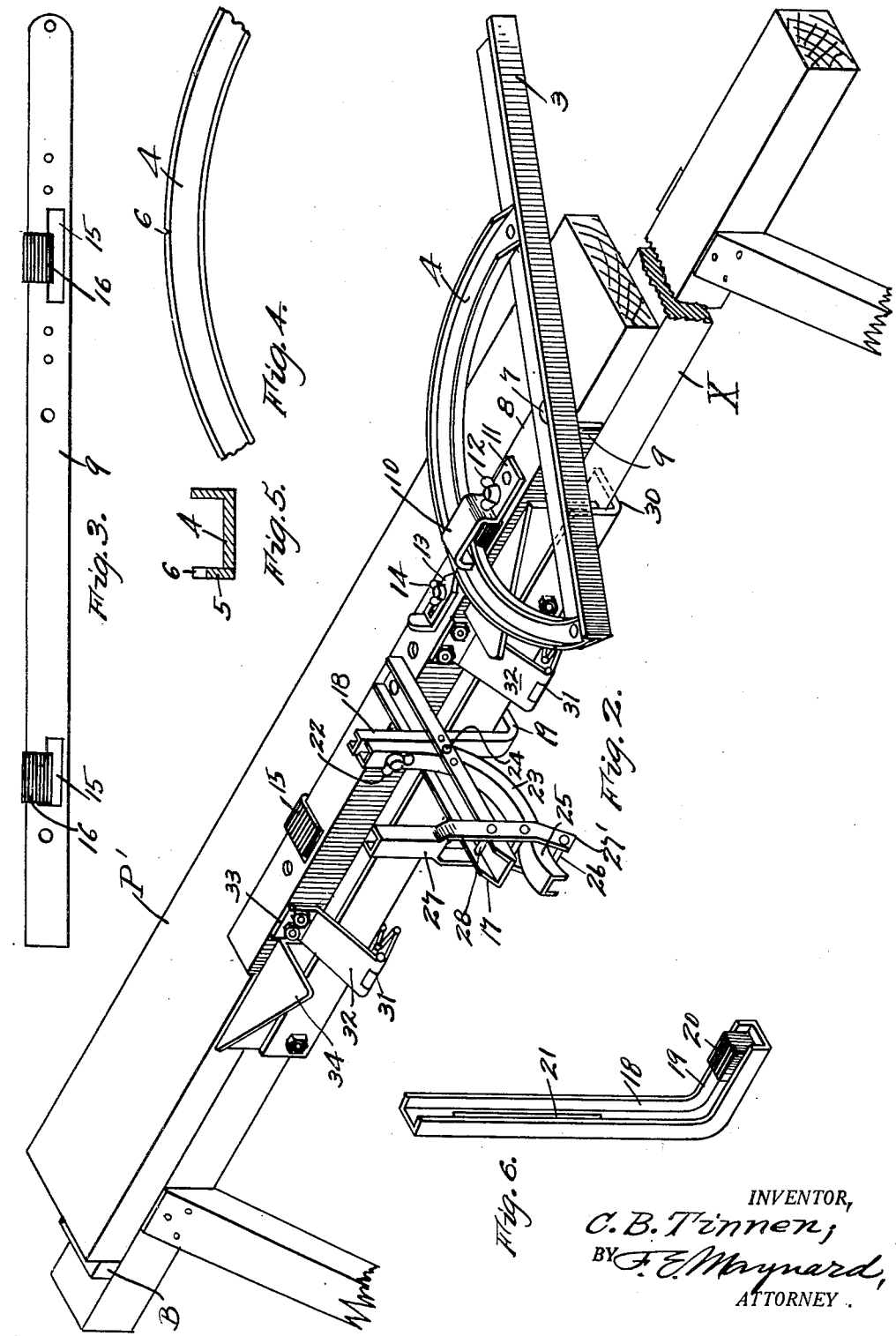
INVENTOR,
C. B. Tinnen;
BY F. E. Maynard,
ATTORNEY.

May 23, 1933.  C. B. TINNEN  1,911,045
PORTABLE GUIDE FOR ELECTRIC SAWS
Filed Jan. 2, 1932  4 Sheets-Sheet 3
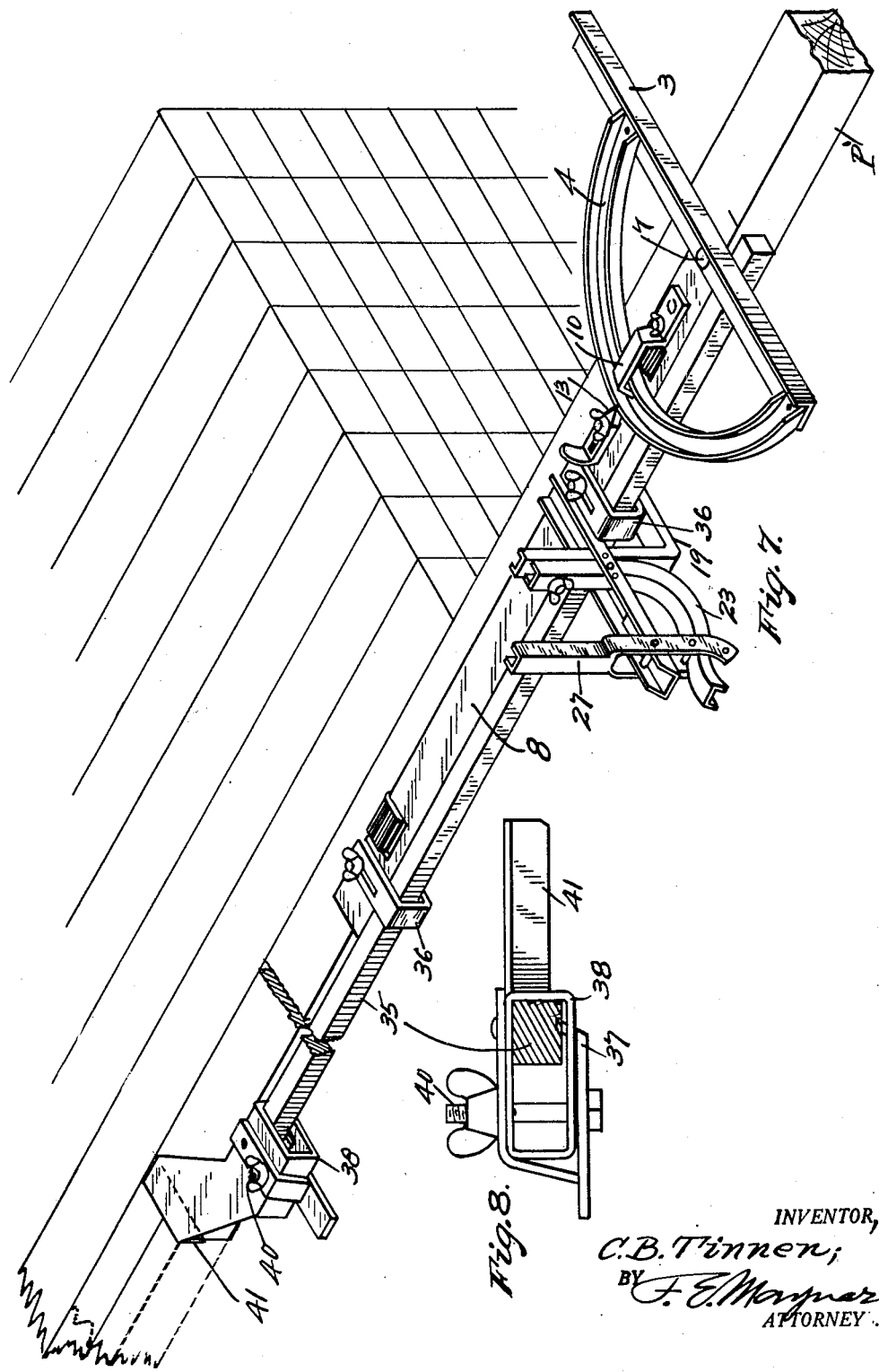
INVENTOR,
C. B. Tinnen;
BY F. E. Maynard
ATTORNEY.

May 23, 1933.  C. B. TINNEN  1,911,045
PORTABLE GUIDE FOR ELECTRIC SAWS
Filed Jan. 2, 1932  4 Sheets-Sheet 4
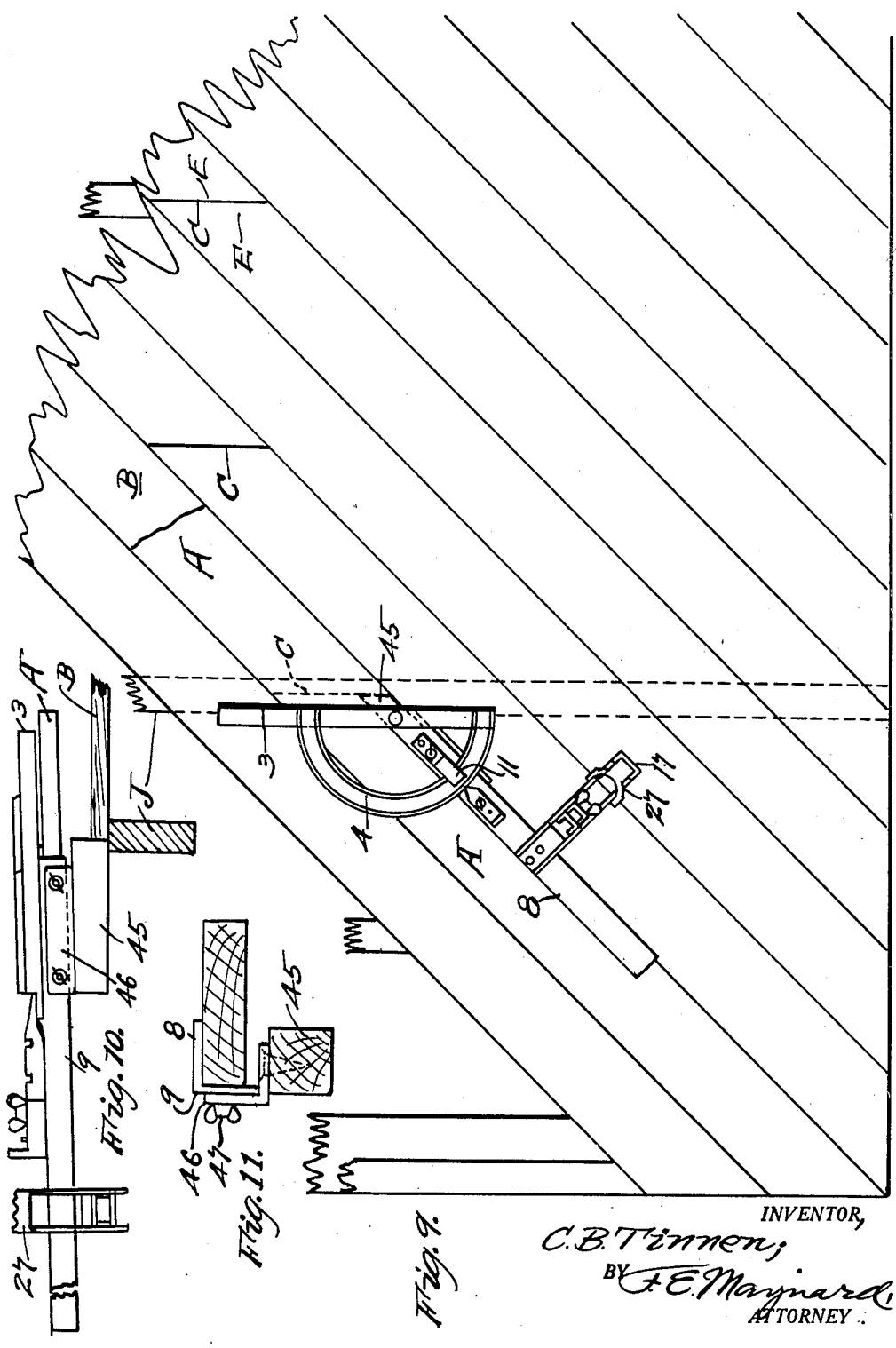
INVENTOR,
C. B. Tinnen;
BY F. E. Maynard,
ATTORNEY Patented May 23, 1933

1,911,045

UNITED STATES PATENT OFFICE

CLYDE B. TINNEN, OF LOS ANGELES, CALIFORNIA

PORTABLE GUIDE FOR ELECTRIC SAWS

Application filed January 2, 1932. Serial No. 584,400.

This invention relates to hand tools and has for its broad object the provision of a portable guide for portable electric hand saws.

Small power hand saws have gone into extensive use in carpenter operations and it is an object of the present invention to provide a substantial saw guide for cooperation with the type of electric hand saw referred to. A further object is to provide a portable electric saw guide which is adapted to be readily carried from place to place about a construction job for the economic cutting of lumber or wooden pieces when in place or as disposed of about the premises. In particular, an object is to provide a portable clamp and guide which is to be applied to the near side of the stock which is to be cut, in contrast to various forms of stock clamps which are applied to the far side of the piece of stock which is to be cut.

A further object of the invention is to provide a portable device which can be readily laid against individual pieces, one after the other, in a pile of lumber lying in the position as discharged from a lumber truck and to provide a guide incorporating means enabling cutting of the stock on any desired angle transversely of the stock and also including a length gage to predetermine the length of piece to be cut as well as providing for the desired angle of saw cut.

A further object of the invention is to provide a composite stock clamp, angle gage and saw guide for efficient use in cutting lumber to desired length and at a desired saw cut angle while the lumber is rested upon a length gaging jack.

An additional object is to provide a saw guide and stock clamp readily adapted for use in cutting diagonal ends on laid rough flooring so that the diagonal ends of the strips may be closely butted on floor joists in a good workmanship job. A further object is to provide for the accurate interconnection and relative saw movement of an electric hand saw with respect to a coordinate guide element of the guide device.

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 2 is a perspective of the device as adapted to a carpenter jack on which is applied a piece of stock gaged for length on the jack and clamped ready for sawing with the saw guide set at a desired angle.

Figure 3 is a plan showing in detail the clamp bar of the tool.

Figure 4 is a plan of a portion of the angle segment, and

Figure 5 is a cross section of the same.

Figure 6 is a perspective of an adjustable clamp jaw of the device.

Figure 7 is a perspective of the device as adapted for application to successive pieces of stock in a pile of lumber; the device being set up to gage the length of the piece, to clamp the gaged piece and to determine the angle of cut by the applied electric saw, and Figure 8 is an elevation of the far end butt stop.

Figure 9 is a plan of a portion of a rough diagonal sheathing strip flooring and showing the application of the tool for effecting a diagonal end cut of strips of sheathing over joists.

Figure 10 is a side elevation of the guide applied to a sprung up floor strip end.

Figure 11 is an end view of a bolster applied to the guide bar.

Figure 1:
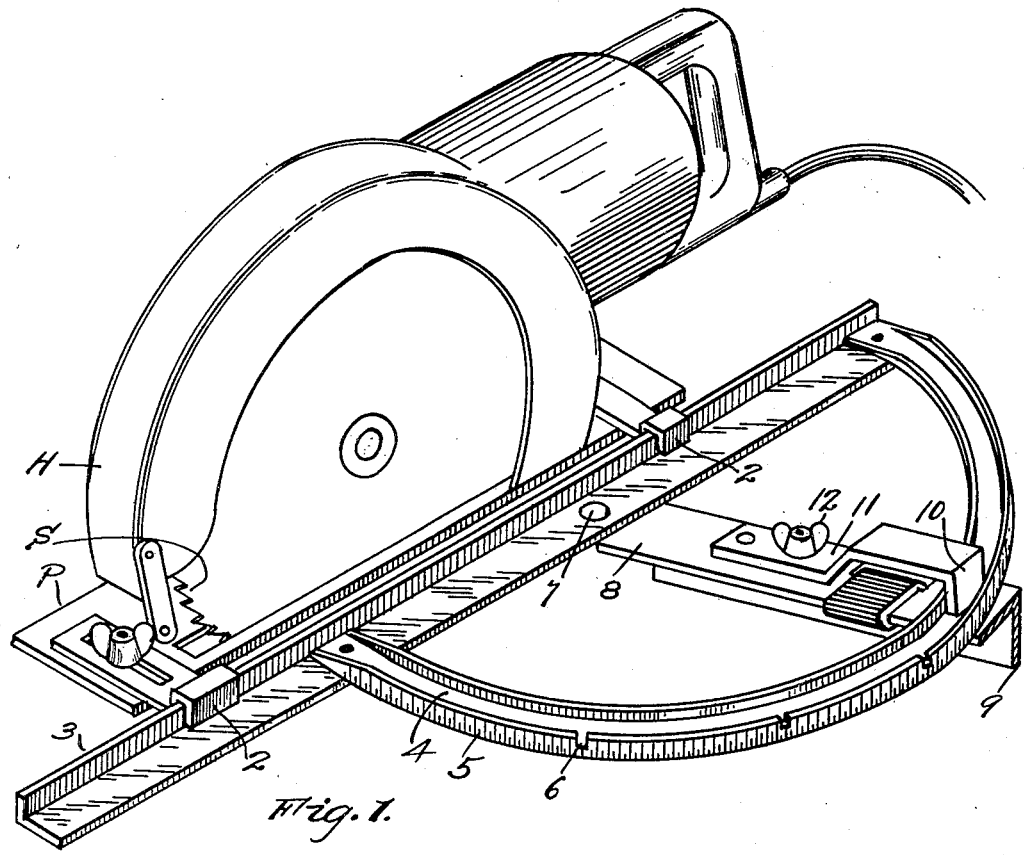
Figure 1 is a perspective showing a conventional form of electric hand saw as applied to the relative guide rail of the present improved guide and gage device, a part of which is broken away.

There is conventionally shown in Fig. 1 a form of electric hand saw S whose housing H is provided with an adjustable throat plate P through which the saw disc projects for engagement of the stock which is to be cut. To this plate is attached a set of shoes 2 suitably spaced apart and adapted to embrace and slide along a guide rail 3 of stiff material and from which the saw disc is spaced as determined by the shoes 2.

To the rail 3 there is rigidly secured a semicircular segment 4 whose outer face is formed by a graduated scale 5 divided into degree marks and at certain angles of which there are provided bolt receiving notches 6; these notches being located on the "positive" degree marks, such as the 30°, 45°, 60° and 90° marks. The rail 3 is provided with a center pivot 7 coinciding with the center of the segment 4 and on this pivot turns a substantial elongated bar 8 preferably of angle iron having an outside, down turned butt flange 9 adapted to be laid against the rear face (that is, near to the carpenter) of a piece of stock to be cut. The clamp bar 8 is adapted to be swung angularly on its pivot 7 to various positions along the segment 4 and then clamped tight by presser finger 10 having a shank 11 attached to the top of the clamp bar 8 and provided with a wing nut bolt 12 whereby the presser finger 10 can be set down hard on the segment 4 at the desired position along the segment.

To further insure security of adjustment of the clamp bar 8, as to the segment 4, the bar has a sliding bolt 13, Fig. 2, adjustable into one or another of the notches 6 of the gage face 5; the adjusted bolt being set tight by means of a wing nut bolt 14.

The gage bar 8 is provided with eye holes 15 allowing inspection to see if the bar is set up close against the contiguous face of a piece P' which is to be cut. Also, in order to secure increased clamping friction, rubber or other pads 16 are provided in the clamp bar to bear on the top of the piece P being cut.

In order to effect a tight clinch of the clamp bar upon the stock piece P', the bar is provided with a lateral fixed arm 17 slotted to receive a vertically adjustable standard 18 having a toe 19 bent to a position under the clamp bar and preferably provided with a friction pad 20. The standard 18 has a back slot 21 through which passes a wing nut bolt 22 carried in the upper end of a curved lever 23 pivoted at 24 on the arm 17 and having an out-turned cam end 25 engaged by a cross pin 26 in the lower end of a hand lever 27 which is pivoted at 28 in the arm; the lever 27 having a set of spaced tines 27' straddling the arm 17 and the cam horn 25.

In application of the clamp toe 19, the wing bolt 22 is loosened and the toe is adjusted upwardly to lightly engage against the bottom of the stock P' or the bottom of a horse beam X, as the case may be, and then by pulling out the top of the hand lever 27, the clamp toe pad 20 is set up tight and draws the clamp bar 9 hard down on the top face of the stock. During this action, the cam pin 26 rides under the cam horn 23 and locks the clamp toe cushion 20 up to clamping position about the pivot 24.

When a large number of pieces P are to be cut to even lengths and sawed off on a given angle, the carpenter uses a horse beam X for a bed, and at the far end fastens a block of wood B to form a butt gage for the far end of the pieces P' to be cut. To the bottom of the horse beam X there is secured an angle plate 30 of suitable length and which is provided with sets of hinge links 31 whose upper ends are connected with bracket arms 32 which are fixed at 33 against the side flange 9 of the clamp bar 8; these bracket arms being well spaced and are designed to pass upwardly between lateral guide ledges 34 which are secured to the ends of the bottom bar or angle plate 30. In the use of this form of tool, the bottom bar or angle plate 30 is fastened to the bottom of the horse beam X and is attached to the flange 9 of the top clamp bar 8 by means of the hinges 31 and the brackets 32. This enables the lifting and lowering of the clamp bar 8 for the introduction and removal of the pieces P' to be cut; the guide ledges 34 acting as supports to prevent end movement of the top clamp bar 8. After a piece P' has been inserted under the clamp bar 8, this is then clamped down by action of clamp lever 27 on the clamp toe 19, as above described.

It will be understood that each piece P' will be applied to the horse beam X and abutted against the far stop B and that the angle segment and guide rail 3 will be adjusted to determine the angle of cut across the piece P.

It will be understood that the bottom clamp combination 30 can be detached from the top clamp bar 8 by removal of the brackets 32 therefrom, and this leaves the clamp structure 8, 24–27, and guide rail 3 as an organized unit for use without the bottom clamp or attachment 30.

For instance, it may be desired to measure and cut to length pieces P' of lumber as stacked in a dumped truck load; Fig. 7. For such use, the clamp bar 8 is attached to a tram-bar 35 by means of clamp clips 36 drawn against the side flange 9 of the clamp bar, the far end of the tram-bar being clamped by a finger 37 in a box 38 by action of a tension bolt 40 on the top of the box. The box 38 is provided with a transversely extending stop flange 41 so disposed as to engage the far end of the piece P' in the pile of lumber which is to be cut up to dimension. The near piece is advanced endwise from the pile as shown in Fig. 7, and the angle setting guide rail 3 is adjusted to the desired transverse line of cut position and clamped up as before described.

In this use of the tool, the top clamp is clamped down by the clamp mechanism acting through handle 27; the saw guide rail 3 being disposed and held at the proper position for length and angle of cut of the piece. It will be seen that the tool is simply pushed against the advanced pieces, one after the other in pile by application of the tool to the near face of the piece which is to be cut.

In good house construction, a rough flooring is made of undressed siding which is laid diagonally on the joists J of the building frame, and the meeting ends E—E of such rough strips are abutted over the joists on lines C and to facilitate such butt joining of the strips, there is provided a bolster block 45 with a clamp flange 46 adapted to be fastened by bolts 47 to the downturned flange 9 of the clamp bar 8, Fig. 11. The bolster 45 is shown in Fig. 10 as lapped on a joist J and abutted against the end of a floor strip B. In such position, the saw guide 3 is not only held elevated by the bolster 45, but it is also set at the desired line of cut C on which to sever the overhanging end of floor strip A to which the gage is applied and then clamped by the clamp device 27, as above set forth.

The adjustment is clearly shown in Fig. 9 where the overhanging end of the piece A, above the laid piece B, is to be cut off on the line C. This attachment provides for the handy and accurate cutting by the electric saw to match the diagonal flooring at butt ends on the joists.

What is claimed is:

1. A portable guide adapted to receive and guide a portable saw carriage and applicable to the near side of a piece to be cut and having guide means for the applied electric saw, and a member connected to the underside of said guide having a side face for abutment against the near end of a piece of stock and adaptable on an under face to rest upon a contiguous body and operative to space the saw guide above the adjacent abutted stock whereby to permit a piece of stock which is to be cut and abutted against the first named piece to be placed over the abutted piece but under the guide.

2. A carpenter's portable saw guide attachable to a carpenter's sawing jack and including a base member and a clamp bar hingedly connected to said base member and adapted to be swung upwardly to permit a piece of stock to be placed under the clamp bar and on said jack, and means for closing the clamp bar upon the stock piece, and a saw guide adjustably mounted upon the clamp bar for determining the direction of saw cut.

3. A carpenter's portable saw guide attachable to a carpenter's sawing jack and including a base member and a clamp bar hingedly connected to said base member and adapted to be swung upwardly to permit a piece of stock to be placed under the clamp bar and on said jack, means for closing the clamp bar upon the stock piece, a saw guide adjustably mounted upon the clamp bar for determining the direction of saw cut, and position defining means for supporting the applied clamp bar.

4. In a portable saw carriage guide, a supporting clamp, an L-section rail pivoted between its ends on one end of said clamp and turnable thereabout, and a semi-circular channel-section member whose ends lap and are attached to said rail and whose base slides on said clamp when the rail is turned on its pivot, and means for engaging the said member to secure the adjusted rail; the latter presenting an uninterrupted upturned flange forming a guide lip.

CLYDE B. TINNEN.